United States Patent [19]

Hedrick

[11] Patent Number: 4,495,130

[45] Date of Patent: Jan. 22, 1985

[54] METHOD OF MOLDING AN ELECTRICAL CONNECTOR

[75] Inventor: Paul A. Hedrick, Georgetown, Ky.

[73] Assignee: Essex Group, Inc., Fort Wayne, Ind.

[21] Appl. No.: 481,976

[22] Filed: Apr. 4, 1983

Related U.S. Application Data

[62] Division of Ser. No. 306,113, Sep. 28, 1981, Pat. No. 4,398,785.

[51] Int. Cl.[3] .......... B29C 6/04; B29C 1/00

[52] U.S. Cl. .......... 264/255; 264/254; 264/263; 264/274

[58] Field of Search .......... 264/254, 255, 263, 274

[56] References Cited

U.S. PATENT DOCUMENTS

| | | | |
|---|---|---|---|
| 2,583,026 | 1/1952 | Swift | 264/274 |
| 3,044,127 | 7/1962 | Alden | 264/254 |
| 3,141,054 | 7/1964 | Francis | 264/255 |
| 3,434,501 | 3/1969 | Conrad | 264/274 |
| 3,668,779 | 6/1972 | Turner | 264/263 |

*Primary Examiner*—James Lowe

*Attorney, Agent, or Firm*—Robert D. Sommer

[57] ABSTRACT

An electrical connector and a method of making the same in which the electrical connections of contacts to the bared ends of the stranded conductors of a cord are positioned within two layers of insulating material. An inner body of insulating material has spaced arms joined to a base with each arm surrounding a corresponding one of the connections. The inner body is injection molded in a mold cavity with serrated or other type irregularly shaped inner surfaces which provide a turbulent flow of fluid insulating material that tends to force any loose strand at the bared ends of the conductors away from the inner surfaces. An outer body of insulating material is injection molded around the inner body and between the arms of the inner body.

4 Claims, 8 Drawing Figures

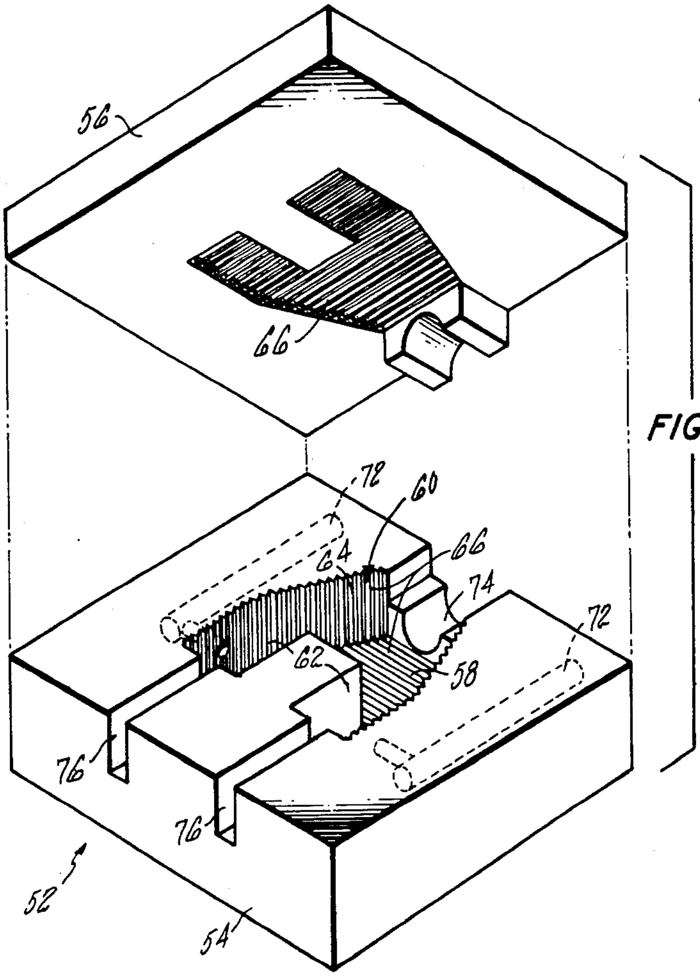
FIG. 5
FIG. 7
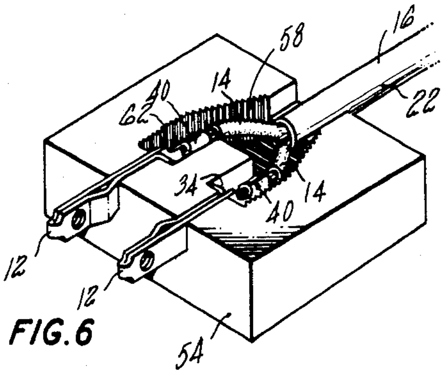
FIG. 6
FIG. 8
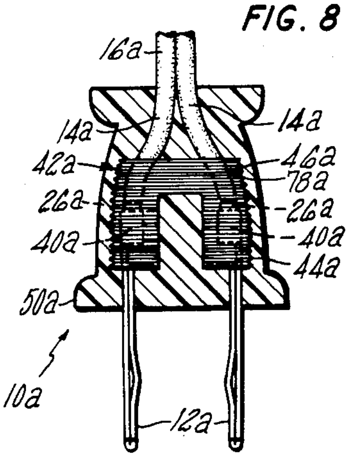

METHOD OF MOLDING AN ELECTRICAL CONNECTOR

This is a division of application Ser. No. 306,113 filed on Sept. 28, 1981, now U.S. Pat. No. 4,398,785.

BACKGROUND OF THE INVENTION

This invention relates generally to electrical connectors and a method of making same, and more particularly relates to electrical connectors of the type in which molded electrical insulating material overlies the connections between the terminal ends of spaced contacts and the conductors of an electrical cord, and also to an improved method of making such connectors.

It is already known from U.S. Pat. No. 3,093,434 granted June 11, 1963 and U.S. Pat. No. 3,141,054 granted July 14, 1964 to construct electrical connectors with a first body of insulating material molded over the connections of contacts to the stranded conductors of a cord and with a second or outer body insulating material molded around the first body. This construction was devised to prevent any loose conductor strands from coming too close to the external surface of the connector or tending to short circuit within the connector. However, it has been found that this construction does not fully solve the loose strand problem. Unless special precautions are taken, it is not unusual for loose conductor strands to be forced to the surface of the inner body during molding of inner body. These exposed conductor strands may then show through the subsequently molded relatively thin outer body. A similar problem is also encountered when the cord of the connector includes a filler of fibrous material laid between the conductors and stray strands of the filler are forced to the surface of the inner body.

SUMMARY OF THE INVENTION

Accordingly, the general object of the present invention is to provide an improved electrical connector construction and a method of making same which eliminates or minimizes deficiencies and problems encountered heretofore as discussed hereinabove.

In accordance with one aspect of this invention, an improved electrical connector includes two spaced contacts mechanically and electrically connected to the respective bared ends of the insulated stranded conductors of an electrical cord. An inner body of molded insulating material has a pair of spaced arms joined to a base with each arm surrounding a corresponding one of the connections between the contacts and the conductors. The inner body has irregular outer surfaces with raised and depressed portions to minimize the possibility of any loose conductor strand being forced to the outer surfaces during molding of the inner body. These irregular surfaces may be in the form of alternating ridges and grooves arranged in parallel rows. An outer body of molded insulating material surrounds the inner body and extends between the arms thereof to further insulate the connections.

The invention, in accordance with one embodiment thereof, provides an improved method of making an electrical connector which has two contacts electrically and mechanically connected to corresponding bared ends of an electrical cord. After the contacts are attached to the conductors, the connections and portions of the contacts and the conductors contiguous to the connections are inserted in the cavity of a mold having two spaced arm cavity regions joined to a base cavity region which have irregularly shaped inner surfaces with raised and depressed portions. These irregularly shaped surfaces may be in the form of alternating ridges and grooves arranged in parallel rows. The two connections are disposed in respective arm cavity regions and the conductors extend into the base cavity region. Electrical insulating material in fluid condition is injected into the mold cavity at a flow rate providing a turbulent flow over the irregularly shaped surfaces which tends to force any loose strands of the bared ends of the conductors away from these surfaces. After the unoccupied space of the cavity is filled, the insulating material is allowed to solidify thus forming a first molded body having spaced arms surrounding the connections and joined at a base. Subsequently. an outer body of insulating material is injection molded around the first body and between the arms of the first body.

For a better understanding of the invention, reference may be had to the following detailed description taken in connection with the accompanying drawings, in which:

BRIEF DESCRIPTION OF THE DRAWINGS

FIG. 5 is a somewhat schematic perspective view of a mold used in carrying out the invention in one form thereof;

FIG. 6 is a perspective view of one member of the mold of FIG. 5 and showing the contacts and the cord of FIG. 2 in the cavity portion of the mold member;

FIG. 7 is an enlarged sectional view illustrating the irregularly shaped inner surfaces of the mold members of FIG. 5; and FIG. 8 is an elevational view partly in section of another electrical connector constructed in accordance with the principles of the present invention.

DESCRIPTION OF THE PREFERRED EMBODIMENTS

Figure 1:
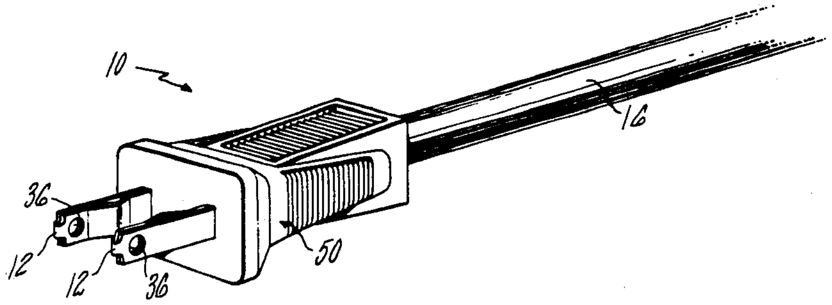
FIG. 1 is a perspective view of an electrical connector constructed in accordance with the principles of the present invention.
Figure 2:
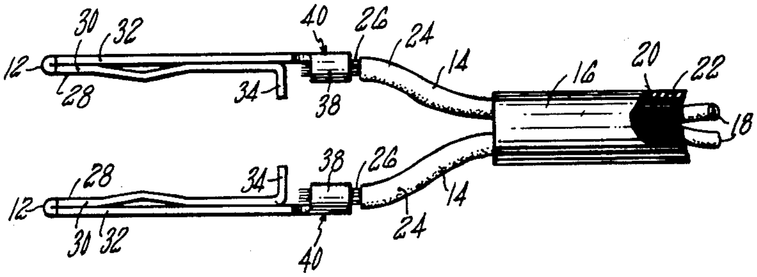
FIG. 2 is an elevational view partly broken away and partly in section of two contacts and an electrical cord used in constructing the connector of FIG. 1.

Referring now to the drawings, particularly FIGS. 1–4, there is shown an electrical connector 10 in accordance with a first embodiment of the invention. The connector 10 includes a pair of contacts 12 which are connected to the stranded conductors 14 of an electrical cord 16. Each conductor 14 comprises a plurality of helically twisted wires and is surrounded by a layer 18 of flexible insulation. The insulated conductors 14 are twisted together with a filler 20 of fibrous material laid in the valleys between the twisted pair of insulated conductors. The conductors and the filler may be covered and bound together by a layer of paper or the like (not shown) and are surrounded by an outer jacket 22 of insulation. As shown in FIG. 2, the respective end portions of the jacket 22 and the filler 20 are removed from the cord 16 to expose short segments 24 of the conductors 14. A relatively shorter end portion of the insulation layer 18 is stripped from each conductor 14 to bare the ends 26 of the conductors for electrical connection to the contacts 12.

Each of the contacts 12 includes a flat metal strip folded back upon itself to form a blade section 28 of two superimposed layers 30 and 32. The layer 30 may be permanently arched relative to the layer 32 to provide a spring action engagement of the blade section 28 with a mating receptable connector (not shown). Each layer 30 may also include an inturned tab 34 at its free end to serve as an anchor holding the contact 12 against movement in the connector 10. Each blade section 28 preferably has holes 36 formed by punching through the layers 30 and 32. At the free end of its layer 32, each contact 12 has an extended terminal portion 38 which is crimped around the bared end 26 of the corresponding conductor 14 to form an electrical and mechanical connection 40.

Figure 3:
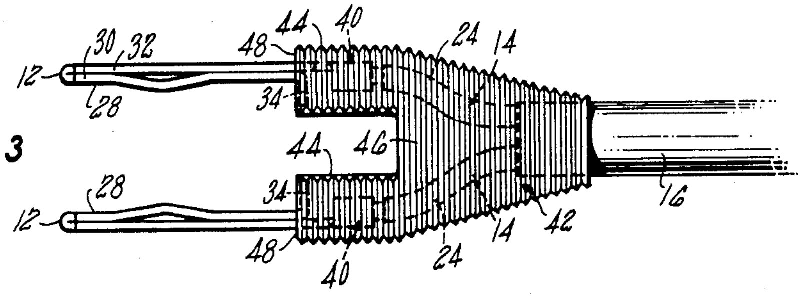
FIG. 3 is an elevational view showing an inner body of insulating material molded around portions of the contacts and the cord of FIG. 2.

The connector 10 also comprises an inner body 42 of insulating material which may be injection molded in the form illustrated in FIG. 3. The body 42 has spaced arms 44 which are joined together at a base 46. Each of the arms 44 surrounds a corresponding one of the connections 40 to position the contacts 12 and the connections 40 in spaced relationship. Each arm 44 also extends along the blade layer 32 of the corresponding contact 22 from the terminal portion 38 to define a frontal portion 48 at its end that is substantially coplanar with the tab 34 on the blade layer 32. The base 46 surrounds the exposed segments 24 of the insulated conductors 14 and the portion of the cord 16 adjacent the terminated end of the jacket 22. Thus, the contacts 12, the connections 40, the conductor segments 24, and the cord 16 are all encased and positioned relative to each other by the inner body 42.

Figure 4:
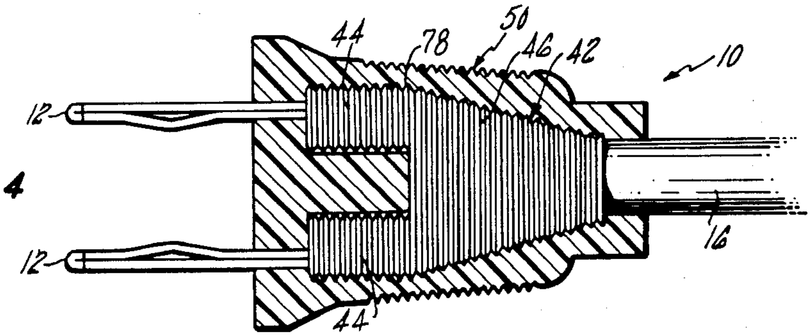
FIG. 4 is an elevational view partly in section of the connector of FIG. 1.

The connector 10 further includes an outer body 50 of insulating material injection molded over the inner body 42 as illustrated in FIG. 4. The body 50 surrounds the body 42 to form the external covering of the connector 10 and further extends between the arms 44 to provide an additional insulation barrier between the connections 40. It will be apparent that the connector 10 as thus far described is of a double insulated type somewhat similar to that described in the aforesaid U.S. Pat. Nos. 3,093,434 and 3,141,054. In the manufacture of this type of connectors, there is a tendency for any loose strands at the bared ends of the conductors to be forced to the external surface of the inner body. Although the gap between the spaced arms of the inner body is effective to prevent the stray wires from crossing over to cause internal shorts, the stray wires may show through the relatively thin outer body or even extend close to the external surface of the outer body. When the cord of the connector includes a filler of fibrous strands, stray ends of the fibrous strands similarly may show through the outer body. The present invention obviates these loose strand problems by effectively capturing stray wire strands and stray ends of filler strands within or on the external surface of the inner body.

Referring now to FIGS. 5–7, there is shown, in somewhat schematic form, a mold 52 of the injection type for molding the inner body 42 of a connector 10 in accordance with the present invention. The mold 52 includes a pair of mating mold members 54 and 56 and the member 54 is provided with a cavity portion 58 that forms a mold cavity 60 when the mold members are brought together as shown in FIG. 5. The mold cavity 60 is of a configuration corresponding to the external shape of the inner body 42 and comprises two spaced arm cavity regions 62 joined to a base cavity region 64. The bottom, top and side walls of the mold cavity 60 each have irregularly shaped surfaces formed by a series of serrations 66 which as illustrated in FIG. 8 comprise alternating ridges 68 and grooves 70 arranged in parallel rows. The ridges 68 may have a height on the order of 0.5 mm and may be spaced at intervals of about 0.5 mm.

The mold member 54 is provided with two inlet passages each communicating with a respective arm cavity region 62 forming a pair of sprue channels 72 through which the molding material is introduced into the mold cavity 60. The mold member 54 has a semicylindrical recess 74 at one end of the base cavity region 64 which snugly receives the jacket 22 of the cord 16. The mold member 54 also has a pair of recesses 76 opening to the arm cavity regions 62 which snugly receive the blade sections 28 of the contacts 12.

Prior to molding of the inner body 42 of the connector 10, the terminal portion 38 of each contact 12 is crimped around the bared end 26 of the associated conductor 14. The contacts with the cord 16 are then placed in the mold member 54. The blade sections 28 of the contacts are received in the recesses 76 and the cord 16 is received in the recess 74 with the terminated end of the jacket 22 well within the mold cavity portion 58. When the mold members 54 and 56 are brought together, the connections 40 are disposed in respective arm cavity regions 62 with the conductor segments 24 extending into the base cavity region 64.

After the mold members 54 and 56 are clamped together to seal the mold cavity 60, electrical insulating material in fluid condition is rapidly forced into the arm cavity regions 62 through the sprue channels 72 under high pressure until the unoccupied space of the mold cavity 60 is filled. The fluid insulating material is injected into the mold cavity 60 at a flow rate which provides a turbulent flow over the raised and depressed portions of the cavity surfaces formed by serrations 66. This turbulent flow over these irregularly shaped surfaces in the arm cavity regions 62 tends to force any loose wire strand at the bared ends of the conductors 14 away from these surfaces. At the same time, the turbulent flow over the irregularly shaped inner surfaces of the base cavity region 64 tends to force any loose strand of filler 20 away from those surfaces.

After the insulating material forming the inner body 42 has solidified, the mold members 54 and 56 are separated and the assembly of the inner body with the contacts and the cord is removed. As can be seen from FIG. 3, the inner body 42 has irregular outer surfaces with serrations 78 or raised and depressed portions corresponding to the serrated surfaces of the mold cavity 60. In the event any loose wire strand or any loose strand of filler was displaced to an outer surface of the inner body 42 during molding, successive portions of it are encircled by the raised portions of the serrations. Thus, there is no possibility that any appreciable part of such a stray wire strand or stray strand of filler being exposed on an outer surface of the inner body 42.

The connector 10 is then completed by injection molding the outer body 50 of insulating material over the inner body 42. Any suitable mold may be used to provide an outer body of the desired form.

The embodiment of the invention illustrated by FIG. 8 is a modification of the embodiment shown in FIGS. 1–4, and hence, corresponding parts of the structure shown in FIG. 8 have been given the same reference numerals with the suffix "a". In this connector 10*a*, the insulated conductors 14*a* are part of a rip cord 16*a* and are connected to contacts 12*a*. These contacts are of the same construction as shown in FIGS. 1–4. Since no filler is present in the cord 16*a*, the base portion 46*a* of the inner body 42*a* may be of reduced size. The inner body 42*a* is molded in a mold similar to that shown in FIGS. 5–7 to form the inner body 42*a* with serrations 78*a* on its outer surfaces. An outer body 50*a* of insulating material is injection molded over the inner body 42*a* and may be of any suitable configuration.

In making the connector 10*a* of FIG. 9, the end of the cord 16*a* is slit to separate the ends of the insulated conductors 14*a*. After the ends of the conductors are bared, the contacts 12*a* are crimped to the bared ends 26*a*. In all other respects, the method of forming the connector 10*a* is similar to the method of forming the connector 10 as described above.

It will be apparent that the irregularly shaped inner surfaces of the mold cavity formed by serrations 66 can be serrated, scored, burled or configured in other ways to cause turburlent flow of fluid insulating material in the mold cavity which forces any loose wire strand and loose strand of filler, if present, away from the irregularly shaped surfaces. The injection flow rates commonly used in injection molding of similar connector bodies of comparable sizes and shapes are adequate to provide the required turburlent flow.

While there have been described above the principles of this invention in connection with specific connector constructions and method of manufacture, it is to be clearly understood that this description is made only by way of example and not as a limitation to the scope of the invention.

What is claimed is:

1. The method of making an electrical connector consisting essentially of the steps of: electrically and mechanically attaching two contacts to corresponding bared ends of two insulated stranded conductors of an electrical cord to form a pair of connections; inserting said connections and portions of said contacts and said conductors contiguous to said connections in the cavity of a mold having two spaced arm cavity regions joined to a base cavity region with said two connections disposed in respective arm cavity regions and said conductors extending into said base cavity region; at least said two arm cavity regions of said mold cavity having irregularly shaped inner surfaces with raised and depressed portions; injecting electrical insulating material in fluid condition into said cavity and continuing the injection until the unoccupied space of said cavity is filled; said injection being at a flow rate providing a turbulent flow over said irregularly shaped surfaces which tends to force any loose strand at the bared ends of said conductors away from said irregularly shaped surfaces; permitting the insulating material within said cavity to solidify thus forming a first molded body having spaced arms surrounding said connections and joined to a base with any loose strand at the bared ends of said conductors being effectively captured in said first body; and subsequently injection molding a second insulating body substantially surrounding said first body and extending between said arms to further insulate said connections.

2. The method of claim 1 wherein each of said irregularly shaped inner surfaces is characterized by series of serrations comprising alternating ridges and grooves arranged in parallel rows.

3. The method of claim 1 wherein said electrical cord includes a filler of fibrous strands and a jacket surrounding said filler and said conductors; said jacket and said filler being terminated at a position short of the bared ends of said conductors; and wherein said inserting step includes disposing the terminated end of said jacket in said base cavity region; some of said irregularly shaped inner surfaces partially bounding said base cavity region for providing a turbulent flow of insulating material therein which tends to force any loose strand at the terminated end of said filler away from said some irregularly shaped inner surfaces during said injection step whereby any stray end of said filler strands of said terminated end of said jacket are effectively captured in said first body.

4. The method of claim 3 wherein each of said irregularly shaped inner surface is characterized by series of serrations comprising alternating ridges and grooves arranged in parallel rows.

* * * * *